(12) United States Patent　　(10) Patent No.: US 8,078,579 B2
Grossman et al.　　(45) Date of Patent: Dec. 13, 2011

(54) DATA SOURCE CURRENCY TRACKING AND CURRENCY BASED EXECUTION

(75) Inventors: Michael Grossman, Marlborough, MA (US); John Rees, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 989 days.

(21) Appl. No.: 11/778,033

(22) Filed: Jul. 14, 2007

(65) Prior Publication Data

US 2008/0037854 A1　Feb. 14, 2008

Related U.S. Application Data

(62) Division of application No. 11/777,568, filed on Jul. 13, 2007.

(60) Provisional application No. 60/807,246, filed on Jul. 13, 2006, provisional application No. 60/807,252, filed on Jul. 13, 2006.

(51) Int. Cl.
　　*G06F 7/00*　　(2006.01)
　　*G06F 17/00*　(2006.01)
　　*G06F 9/46*　　(2006.01)
(52) U.S. Cl. ........................................ 707/625; 718/106
(58) Field of Classification Search .......................... None
　　See application file for complete search history.

(56) References Cited

U.S. PATENT DOCUMENTS

| | | | |
|---|---|---|---|
| 4,754,409 A * | 6/1988 | Ashford et al. ................. 706/10 |
| 5,050,105 A * | 9/1991 | Peters ........................... 715/854 |
| 5,222,235 A * | 6/1993 | Hintz et al. ........................... 1/1 |
| 5,581,691 A * | 12/1996 | Hsu et al. ......................... 714/15 |
| 6,256,712 B1 * | 7/2001 | Challenger et al. ........... 711/141 |
| 6,292,803 B1 * | 9/2001 | Richardson et al. ........... 707/102 |
| 6,424,354 B1 * | 7/2002 | Matheny et al. .............. 345/619 |
| 6,895,401 B2 * | 5/2005 | Skinner et al. .................... 707/1 |
| 7,237,240 B1 * | 6/2007 | Chen et al. .................... 718/100 |
| 7,454,399 B2 * | 11/2008 | Matichuk ....................... 706/53 |
| 7,490,317 B1 * | 2/2009 | Hahn et al. .................... 717/121 |
| 7,657,446 B1 * | 2/2010 | Houriet et al. ..................... 705/3 |
| 7,664,985 B2 * | 2/2010 | Ertel et al. ...................... 714/15 |
| 7,680,818 B1 * | 3/2010 | Fan et al. ............... 707/999.103 |
| 2002/0188931 A1 * | 12/2002 | Ewart et al. .................... 717/154 |
| 2003/0046114 A1 * | 3/2003 | Davies et al. ..................... 705/3 |
| 2003/0065669 A1 * | 4/2003 | Kahn et al. .................... 707/100 |
| 2003/0163488 A1 * | 8/2003 | Kloos et al. ................... 707/200 |
| 2003/0187862 A1 * | 10/2003 | Brobst ........................... 707/102 |
| 2003/0229650 A1 * | 12/2003 | Olstad et al. .................. 707/200 |
| 2004/0015463 A1 * | 1/2004 | Herrera et al. .................. 706/47 |
| 2004/0068501 A1 * | 4/2004 | McGoveran ...................... 707/8 |
| 2004/0139097 A1 * | 7/2004 | Farber et al. .................. 707/100 |
| 2004/0162741 A1 * | 8/2004 | Flaxer et al. ...................... 705/7 |
| 2005/0033777 A1 * | 2/2005 | Moraes et al. ................ 707/202 |
| 2005/0038673 A1 * | 2/2005 | Stookey et al. ................... 705/2 |
| 2005/0050030 A1 * | 3/2005 | Gudbjartsson et al. ........... 707/3 |

(Continued)

*Primary Examiner* — Charles Kim
*Assistant Examiner* — Jeremy Engelskirchen (57) ABSTRACT

A method and system for determining currency of data in a data processing system. The processing steps along a dependency chain used to populate a data reporting program are back tracked recursively through each processing step until a first originating set of processing steps are reached. The currency of each data source for the programs is identified and it is determined whether the program has run since that time. If any one of the sources for the program of the processing step is more recent than a last run time of the program associated with the processing step, the program is re-run and outputs updated. The same process is executed moving forward along the dependency chain, to each other processing step.

15 Claims, 7 Drawing Sheets

U.S. PATENT DOCUMENTS

| | | | |
|---|---|---|---|
| 2005/0075832 A1* | 4/2005 | Ikeguchi et al. | 702/179 |
| 2005/0091219 A1* | 4/2005 | Karachale et al. | 707/10 |
| 2005/0166094 A1* | 7/2005 | Blackwell et al. | 714/38 |
| 2006/0219772 A1* | 10/2006 | Bernstein et al. | 235/379 |
| 2006/0294459 A1* | 12/2006 | Davis et al. | 715/513 |
| 2007/0214016 A1* | 9/2007 | Bennett et al. | 705/3 |
| 2008/0250057 A1* | 10/2008 | Rothstein et al. | 707/102 |

* cited by examiner

| Program Name | Job Id | Run Timestamp | Source Table Name | Source Table Timestamp |
|---|---|---|---|---|
| P1 | 21010 | 01-10-2005 14:52:01 | S1 | 01-10-2005 14:51:48 |
| P1 | 20303 | 01-04-2005 22:15:34 | S1 | 01-04-2005 22:14:10 |
| P2 | 21008 | 01-10-2005 14:51:48 | S2 | 01-02-2005 17:01:01 |
| P2 | 21008 | 01-10-2005 14:51:48 | S3 | 01-10-2005 14:50:30 |
| P2 | 20297 | 01-04-2005 22:14:10 | S2 | 01-02-2005 17:01:01 |
| P2 | 20297 | 01-04-2005 22:14:10 | S3 | 01-04-2005 22:12:11 |
| P3 | 21004 | 01-02-2005 17:01:01 | S4 | 01-02-2005 15:37:00 |
| P4 | 21007 | 01-10-2005 14:50:30 | S5 | 01-05-2005 14:22:03 |
| P4 | 20100 | 01-01-2005 08:44:03 | S5 | 12-29-2004 02:01:36 |

FIG. 4A

```
Job 21010 - Program P1 - Run Jan 10, 2005 14:52:01

Report Name:  Demo Listing for Study 1030

Currency Lineage

Program P1
Source Table S1, Last modified by Job 21008, Program P2 on Jan 10, 2005 14:51:48
--Program P2
--Source Table S3, Last modified by Job 21007, Program P4 on Jan 10, 2005
      14:50:30
----Program P4
----Source Table S5, Last modified by Job 20573, Program P5 on Jan 5, 2005
      14:22:03
--Source Table S2, Last modified by Job 21004, Program P3 on Jan 2, 2005 17:01:01
----Program P3
----Source Table S4, Last modified by external process on Jan 2, 2005 15:37:00
----                 Identified by external system as Batch Process 4930221
```

DATA SOURCE CURRENCY TRACKING AND CURRENCY BASED EXECUTION

CROSS-REFERENCE TO RELATED APPLICATIONS

This application is a divisional of and claims the benefit of U.S. patent application Ser. No. 11/777,568, which claims priority to and the benefit of U.S. Provisional Application Nos. 60/807,246, and 60/807,252, filed Jul. 13, 2006, the disclosures of which are incorporated herein by reference in their entirety.

BACKGROUND

1. Field

The disclosed embodiments generally relate to data processing systems, and in particular to data processing in data repository systems or data warehouse applications that receive and process data sources that are periodically updated and reported on.

2. Brief Description of Related Developments

Many reports and other data processing outputs are the result of a series of programmatic transformations acting on data that comes from many sources. The sources of data can be updated or can change over time. The state of the data at a particular point in time is referred to as its "currency" and the data is "current" if it is the most recent state of that data. In order to document the content of data on which the outputs are based, it is necessary to document both the processing steps and the currency of the sources of the data that were used to produce the output. In addition, in many cases it is necessary to ensure that the output reflects the most data available from each of the ultimate sources of data, from the beginning of the transformation processes. In other cases, it can be advantageous to be able to access the data in the currency that existed at a previous point in order to produce additional outputs that reflect that previous state of the data. Currently, companies manually determine and document the ultimate sources of the data and rerun or execute all of the intermediate processing steps, to ensure that the output reflects the currency of those sources. Generally, the only available alternative to re-executing all of the processing steps is to manually determine the state of the data in each of the processing steps that precede the output and selectively run or re-run those that need to be run due to more recent or current data (i.e. since the last time the program ran).

These manual processes are error prone and time consuming and this can result in a large use of computer resources and unnecessary delays in the availability of the end reports. It would be advantageous to allow the customers to automatically document the exact data currency used to produce reports and other outputs without needing to maintain time consuming and error-prone manual records. Further, it would be advantageous to reduce the need to re-execute the data processing steps by using this currency information. It would also be advantageous to use this information to provide existing reports and outputs if the source data for them has not changed instead of re-executing the reporting program each time the report is requested. These features allow for much more productive and efficient use of data repositories at lower cost than traditional warehousing solutions. Improved efficiency, reduced program execution, and reduced manual recordkeeping allows for more timely information delivery and decision support.

SUMMARY

The disclosed embodiments are directed to a method and system for determining currency of data in a data processing system. In one embodiment the method includes recording, in a data processing step, each source of data and the last time of any data change that data source was modified by the data processing step that populated that data source. The processing steps along a dependency chain that is used to populate a data reporting program are determined recursively back through each processing step in the dependency chain that populates a source processing step until a first processing step is reached. It is determined whether a program associated with the first processing step has run since each source of data for the processing step was last modified. If any one of the sources for the program of the first processing step is more recent than the last run time of the program associated with the first processing step, the program is run or executed, thus modifying any output data written by that program, and the currency tracking information of each source are recorded. Moving forward along the dependency chain to each other processing step, it is determined whether a program associated with each other processing step has run since each source of data for that processing step was last modified. If any one of the sources for the processing step is more recent that a last run time for the processing step, the program is run, data outputs updated, and the currency tracking information of each source recorded. The process continues until it reaches the data reporting program that initiated the process which, in turn, is executed if any of its sources are more recent than the last time it executed.

In another aspect, the disclosed embodiments are directed to method of determining data currency in a processing chain prior to generating an output report. In one embodiment the method includes backtracking along each source chain in the processing chain until a first processing application is reached; determining if a currency of a program associated with the first processing application is later than a last update of each data input to the first processing application; re-executing the program if one of the data inputs to the first processing application has an update currency that is more recent that the last execution currency of the first processing application; back track along each remaining source chain in the processing chain until a first, unevaluated processing application is reached; comparing a last run time of each program of each such processing application with a currency of each source of data to the respective processing application, and automatically re-executing the program if the currency of one of the source of data is more current that the last run time of the program; and repeating the back track until all processing steps have been evaluated.

In another aspect, the disclosed embodiments are directed to a system. In one embodiment, the system includes a data currency tracking system configured to record a currency of any data change for each source of data in a processing chain and when any target data is modified by the data processing step in the processing chain. The system also includes a backchain system configured to determine the processing steps along a dependency chain used to populate data sources for an initiating data report or processing program recursively back through each processing step in the dependency chain that populates a source processing step until one or more source processing steps do not support execution via a backchain, has sources that are external to the processing system or does not have any data sources. The backchain system is also configured to determine whether a program associated with each such processing step has run since each source of data for the processing step was last modified and if any one of the sources for the program of such processing step is more current than a last run time of the program associated with the processing step, running the program and updating target data and creating report outputs of the processing step and recording tracking information identifying the currency of each source used as input for the processing step.

In a further aspect, the disclosed embodiments are direct to a computer program product stored in a memory. In one embodiment, the computer program product includes a computer useable medium having computer readable code means embodied therein for causing a computer to determine currency of data in a data processing system. The computer readable code means in the computer program product can include computer readable program codes means for causing a computer to record, in a data processing step, each source of data, a currency of any data change for each source and a when any target data is modified by the data processing step. The computer program product also includes computer readable program code means for causing a computer to determine the processing steps along a dependency chain used to populate the data sources for an initiating data reporting or processing program recursively back through each processing step in the dependency chain that populates a source processing step until one or more source processing steps are reached that has data sources whose processing steps do not support execution via a bachchain, has sources that are external to the processing system or does not have any data sources; computer readable program code means for causing a computer to determine whether a program associated with each such processing step has run since each source of data for the processing step was last modified; computer readable program code means for causing a computer to run a program and update target data if any one of the sources for the program of such processing step is more recent than a last run time of the program associated with the processing step; and computer readable program code means for causing a computer to create report outputs of the processing step and recording tracking information identifying the currency of each source used as input for the processing step.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EMBODIMENT(S)

Figure 1:
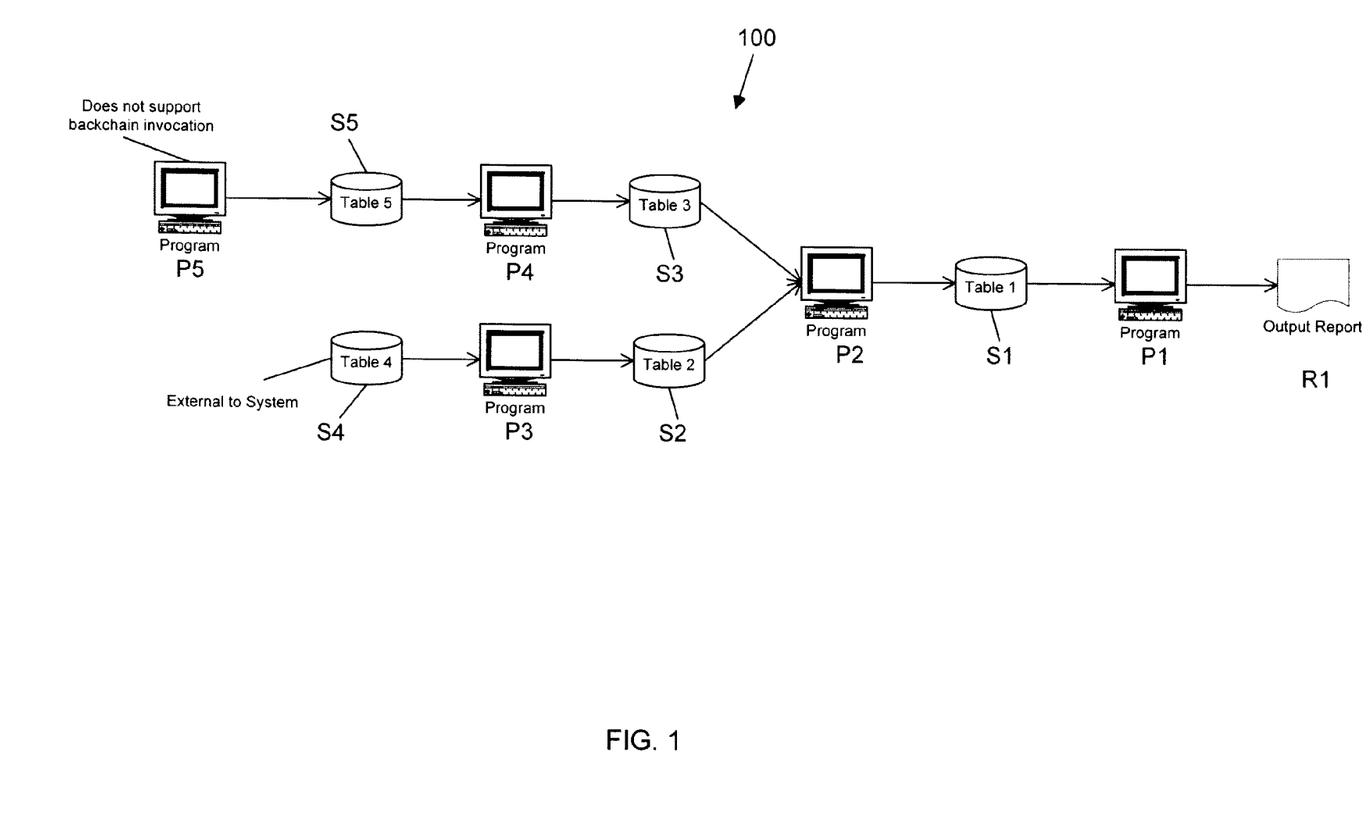
FIG. 1 is a block diagram of one example of a system incorporating features of the disclosed embodiments.

Referring to FIG. 1, one example of a data repository or data warehouse system 100 incorporating features of the disclosed embodiments is illustrated. The system 100 receives and processes data from data sources S1, S2, S3, S4 and S5. The data sources S1, S2, S3, S4 and S5, generally referred to herein as "tables", can be periodically updated based on changes or modifications to the underlying data. In alternate embodiments, any suitable data source can be used, other than including tables. For example, in one embodiment, a data source such as S1 could be a SAS (Statistical Analysis System) dataset. In another example, a data source such as S1 can comprises a computer system file such as a Microsoft™ Excel spreadsheet or a comma-delimited ASCII file. In another embodiment, the data source might comprise a database that can include fields and records. The database can be updated or modified with new or changed data. The database can include or be a part of a data warehouse, that includes data from other sources. While the example of FIG. 1 illustrates a leaf node architecture or processing chain, the architecture of the system of FIG. 1 can be arranged in any suitable manner. For example, the data sources and programs can be arranged in a linear or heirarchial chain. The aspects of the disclosed embodiments can be applied to any dependency chain or network.

As shown in FIG. 1, a data processing output or report R1 is the result of a series of programmatic transformations, e.g. P1, P2, P3, P4 and P5, acting on the data that comes from tables such as for example, S1, S2, S3, S4 and S5. A program, such as P2, can both read data from tables, such as S2 and S3, and modify data in tables, such as S1. Thus a table, such as S1 can both be the target of one program, such as P2, and the source for another program, such as P1. Although, for purposes of this example, only five data tables are illustrated, it will be understood that any suitable number of data tables and programmatic transformations, can be utilized.

The processing steps P1-P5 are arranged in a chain of predecessor and successor steps. Processing step P4 writes to table S3 and is a predecessor to processing step P2 which reads data from table S3. Processing step P3 is also a predecessor to processing step P2. P2 is thus a successor to steps P3 and P4. Successor processing steps are dependent on the results of preceding processing steps. This series of processing steps with ordered dependencies can be referred to as a "dependency chain". Some processing steps, P3, have no predecessors since the source table is external to the processing system and whatever process populates that table is not under the control of the processing system.

In order to document the content of the output R1, it is necessary to document both the processing steps, P1-P5 that were used to produce the output R1, as well as the "currency" of the sources of data, S1-S5, that were used to produce the output of each transformation. The term "currency" as it is used herein, generally refers to the recentness of data, or how up-to-date the data is. This can also be described as the state of the data at a particular point in time. Data is current if it is the most recent state of that data at a defined point, with general reference to time. In alternate embodiments, any suitable state reference may be used. For example, if a source of data has been modified, changed or updated since the last time the program acting on that data ran, it may be advantageous to re-run the program with the modified, changed or up-dated data. It is generally desirable in a data repository or data warehouse system to be able to use the most recent or up-to-date data available to generate a report or data output. Otherwise, an output report R1 might be considered out of date with respect to a particular point in time.

When documenting the currency of the data in a table, several approaches can be used. The simplest is to record the timestamp at which the program that modifies the table was run. The assumption is that when the program runs that the data in the target table is modified. However, this is not necessarily true. For instance, a program that reads data from an external system may not be able to determine whether the data in that system has changed. If it has not changed, then the program may not make any changes to the target tables. So, an alternative way of establishing the currency of the data in the tracking timestamp if there has been a modification. One embodiment of this approach to the change detection is to compare the contents of the table before the program runs to the contents of the table after the program runs. Another embodiment is to have a mechanism that examines the actions the upon the target table as they occur and to ascertain whether any change actions occur or whether the actions that do occur actually change the data in the target.

Figure 4A:
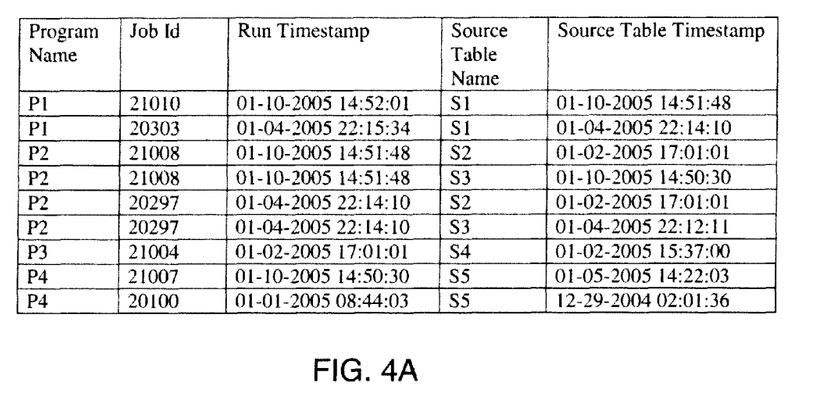
FIG. 4A is an illustration of one example of a currency tracking table incorporating features of an aspect of the disclosed embodiments.

One possible embodiment of a method to ascertain whether a program has run since the currency of its sources changed, is to record the currency of the source data used by a program each time it runs. FIG. 4a illustrates one embodiment of such a tracking mechanism, a system structure or table in which the currency timestamp information for each source table accessed by the program is recorded each time the program executes. This information can then be compared for each source table to determine whether more recent information is available.

Another possible embodiment of a method to determine whether a source table has more recent data than was available the last time a program ran could be based upon information in the table itself. Generally, in a database, each row of data in a table will have a time stamp of some type. The most recent of these timestamps at the completion of the program execution could be used to establish the currency timestamp in a tracking table or it could be obtained immediately by inspecting the source table while evaluating its currency.

Since a processing chain such as that shown in FIG. 1 can comprise a dependency chain or network that includes thousands of processing steps and sources of data, it would be very time consuming and costly to need to re-run every program in the chain order to obtain the most recent data for the output, R1. The back-chaining system of the disclosed embodiments looks back up the processing chain and selectively identifies those sources that have more up-to-date data. Then, only those processing stages or programs that have changed data need to be re-run. Running such a program may modify the tables written to by that program resulting in successor programs now having sources that have changed data and thus those successor programs having to be rerun. Any programs whose data sources have not been updated or changed since the last time the respective program was run, do not have to be re-run. Only those programs with more recent data are re-run prior to running or generating the report R1, thus resulting in significant time and cost savings. If no programs need to be rerun due to data changes, then existing report R1 can be directly used.

There may be processing steps in the processing chain, such as P5, that cannot be automatically rerun when invoked by backchain processing. For example, the processing step may be accessing a system file that may only change when it is manually replaced on the computer file system, and therefore running the processing step that reads the file only makes sense to perform manually when the file is replaced. In that case, the dependency chain terminates at such a step and does not attempt to run it. The process simply evaluates the currency of the target table S5 to see whether it had been previously changed by program P5 since the last execution of program P4.

Figure 3A:
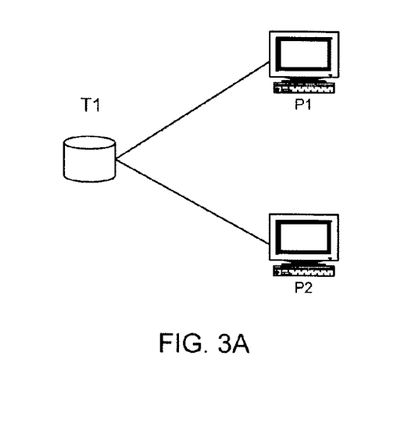
FIGS. 3A, 3B, 3C and 3D are exemplary illustrations of write/read processes of the disclosed embodiments.

The disclosed embodiments illustrate only a single dependency chain in which each table is read by a single program. However, there are variations in which a single table can be read by multiple programs. A partition of a table exists when the data in the table can be separated into independent subsets identified by unique identifiers. Referring to FIG. 3A, a single table can be read by multiple programs. The example shows two programs, but in a complex processing network a single table might be read by any number of programs. For example, a table could easily be read by 100 programs. To support the back-chaining process, each of those programs record the currency of the table at the time that particular program reads from the table. Different dependency chains containing one or more of these programs might therefore contain an independent history of their access to the source data for their programs.

Figure 3B:
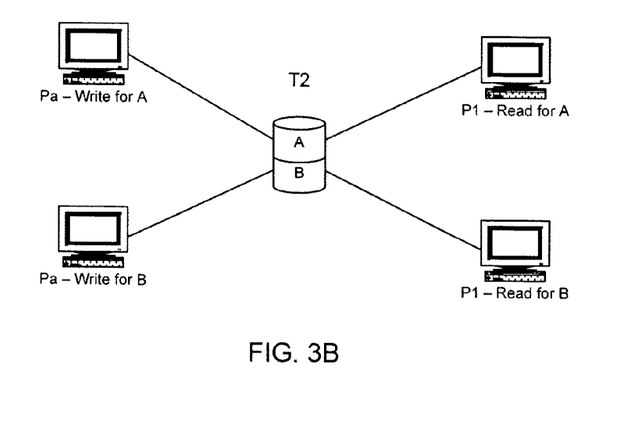
Figure 3C:
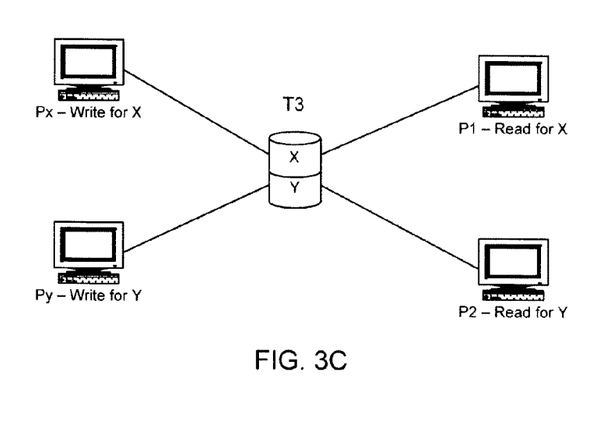
Figure 3D:
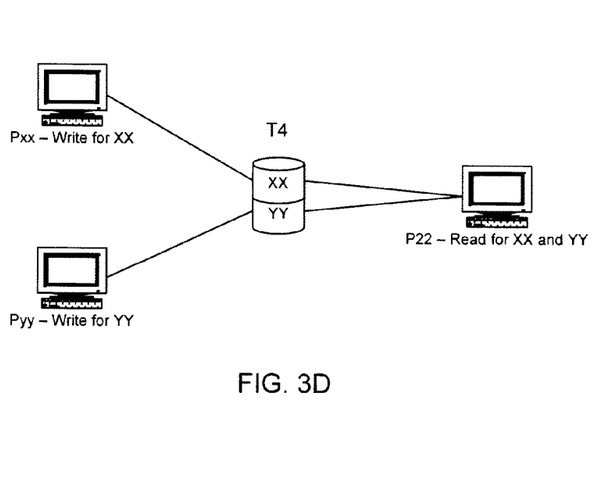

The disclosed embodiments illustrate only a single dependency chain in which each table is written to by a single program. However, there are variations in which separate partitions of a single table can be written to by multiple programs or specialized executions of the same program. A partition of a table exists when the data in the table can be separated into independent subsets identified by a unique identifiers. Referring to FIG. 3B, single table can be written to by separate executions of the same program Pa that independently modify a separate partitions identified by A and B of the table T2. The examples in FIGS. 3B-3D show two partitions, but in practice the number of partitions can be much larger. To support the back-chaining process, a separate currency tracking record must be kept for each table partition. A backchain that is interested in data reflected in partition A can then independently check the currency of that data partition to determine whether it needs to execute. Referring to FIG. 3C, a variation of the multiple writing program case is illustrated where each table partition is modified by a separate program. Program Px modifies table T3 partition X and program Py modifies table T3 partition Y. As in the previous example, a separate tracking record is maintained for each partition along with the system association of the particular programs Px and Py with the table partitions.

Extending the variations with multiple table partitions, FIG. 3B illustrates the case where different executions of the same program, P1, are separately read from partitions A and B. Separate currency tracking records identify which partition was accessed by an execution of the program. FIG. 3C illustrates the case where different programs P1 and P2 access the different table partitions. Separate tracking records for each program identify the currency of their access to the separate partitions. Finally, FIG. 3D illustrates that a single program P22 can access a table T4 with multiple partitions and read from all of the partitions. In this case each execution of program P22 must keep a separate currency tracking record for each partition in the source table.

As referred to above, referring to FIG. 1, the report or other data processing output R1 is shown as the result of programs (P1-P5) acting on data that comes from the sources, S1-S5. When the system 100 is generating the report or output R1 at the end of the process, the system 100 must be able to back-chain, or look back along the chain of dependency, to identify how the data came to be in the tables that are used to generate the report R1 and the currency of the data in each table. In order to have the most up-to-date output prior to running the report R1, the system 100 must determine if there is any more up-to-date information in any of S1, S2, S3, S4 and S5 available that can be used to generate the report R1.

Figure 2:
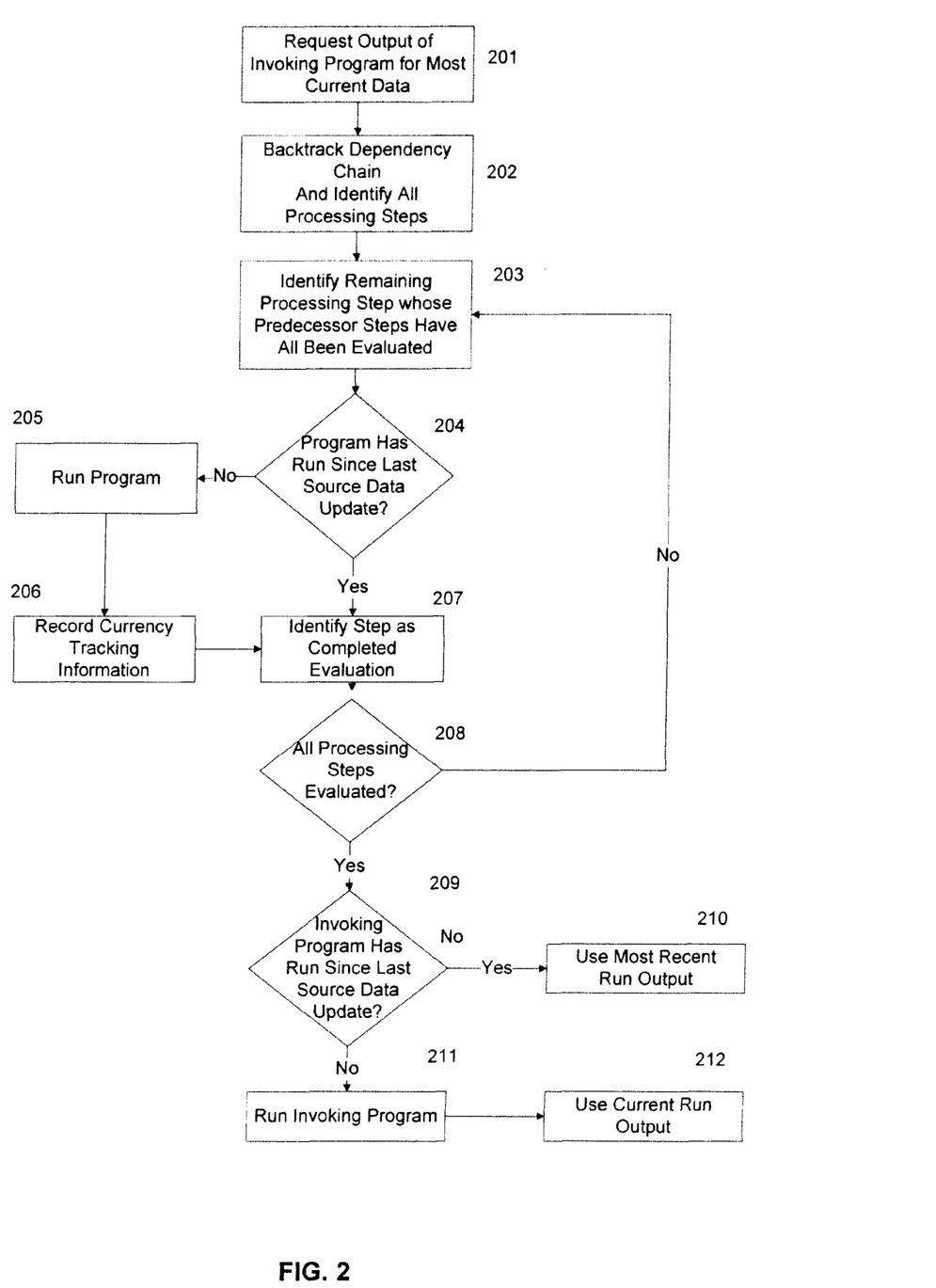
FIG. 2 is a flow chart of one example of a method incorporating features of the disclosed embodiments.

One possible embodiment of a process for determining whether there is any more up-to-date information is illustrated in the following example. Referring to FIGS. 1 and 2, one example of a backchaining process of the disclosed embodiments is illustrated. A reporting program, such as P1, needs the most current available state of data in order to generate the report R1. In the disclosed embodiments, the system or program generating the output R1 will initiate a back-chaining process 201 that can be used to identify and determine the currency of data to be used to generate the output R1. Upon initiation of the back-chaining process, the system 100 determines 202 the processing steps P2-P5 that in the dependency chain that populates the source, S1 that is used by program P1 to generate the report R1. In one embodiment, the system 100 identifies 203 that steps P3 and P4 have no predecessors that can be run or that have not already been evaluated. Note that program P5 is not considered a predecessor to P4 since it does not support execution by a backchain. It is noted that the chain shown in FIG. 1 is a simple chain with only five processing steps. In alternate embodiments, any suitable type of dependency chain with any number of processing steps can be utilized. The first processing step with no unevaluated predecessors, P3, is evaluated to determine 204 whether or not the program associated with P3 has run since the data source S4 was last modified. If the program P3 has not been run since the last data source change to S4 it is run 205, the currency tracking information about the source tables and the program execution time is recorded 206, and the processing step is identified as having completed evaluation 207. Otherwise, if the program P3 has been run since the last source change S4, the program P3 is not run 205 but simply noted as having completed evaluation. The system 100 determines that there are additional, unevaluated predecessor steps 208 and moves to the next programming step P4 with no unevaluated predecessors 203. Once program P4 is in turn either run or just marked as evaluated, the system checks 203 whether any additional processing steps now have no predecessors that have not been evaluated. Program P2 is identified since both of its predecessors, P3 and P4, have now been evaluated. Program P2 is in turn either run or just marked as evaluated. Since there are no further dependent steps 208. The system proceeds to evaluate the invoking program P1. Now it checks 209 whether the program P1 has been run since the data in its source S1 was last modified, whether because it was just modified because P2 ran or because it had already been modified since P1 had last run. If P1 has not executed since S1 was modified, it is run 211 and a new version of Report R1 is produced 212. If P1 has already executed since S1 was last modified, it is not run and the existing version of Report R1 remains the up-to-date or current version 210. Since P1 is the processing step that initiated the backchain, the process is complete.

Figure 4B:
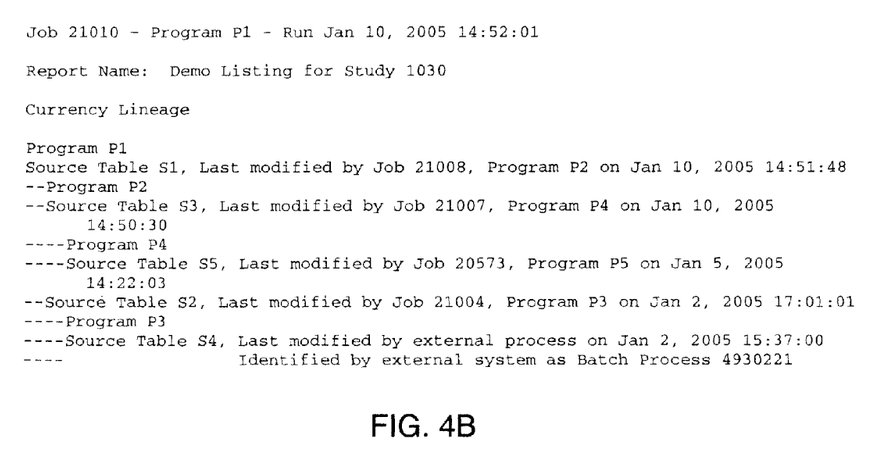
FIG. 4B is an illustration of one example of a currency tracking report using the currency tracking information illustrated in 4A.

Since the currency of the source data used for each processing step is documented in the tracking tables, it is possible to produce a currency lineage report for each output. Referring to FIG. 4b, a possible embodiment of such a report for the dependency chain in FIG. 1 is shown. It is possible to ascertain the details of the currency of the data used to produce the report. Of particular interest might be the fact that this report reflects data provided in table S4 by an external system on Jan 2, 2007 15:37:00 reflecting the external system supplied identification of Batch Process 4930221.

In one embodiment, in order to determine data currency, the system can examine the explicit tracking of execution time or the time stamp information for each source. In alternate embodiments, any suitable measure for determining the currency or most recent data update or change can be utilized other than including execution time or time stamp information.

In the event that the source system for the data input is not part of the invoking data processing system, and is provided by an external source, an interface can be provided between the local system and the external system that can provide modification time stamp information. In addition, the interface can provide other identification information specific to the external system such as a batch processing job number or an accession number that is associated with the currency of the data in the external system.

Figure 6:
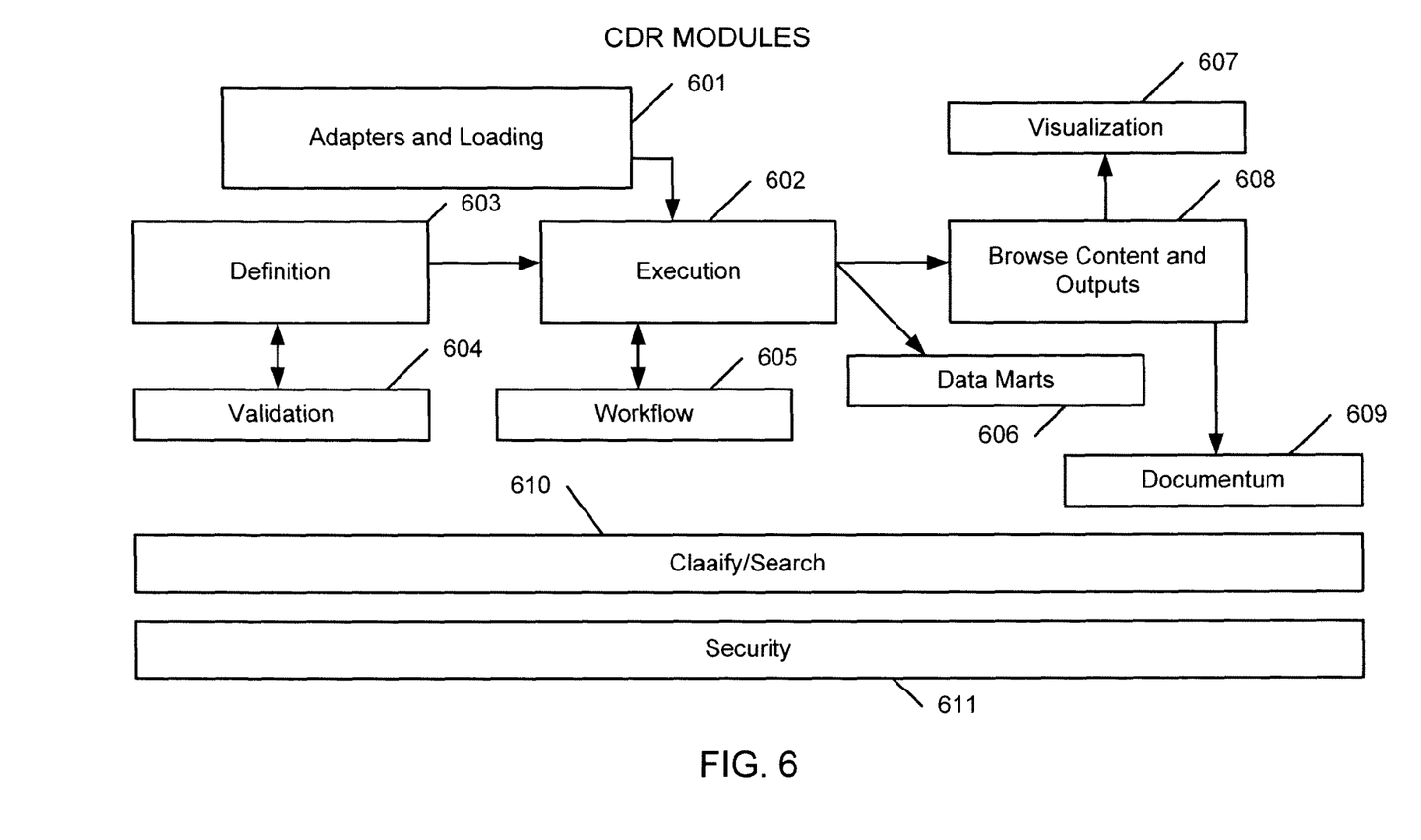
FIG. 6 is a block diagram illustrating an exemplary CDR module incorporating features of the disclosed embodiments.
Figure 7:
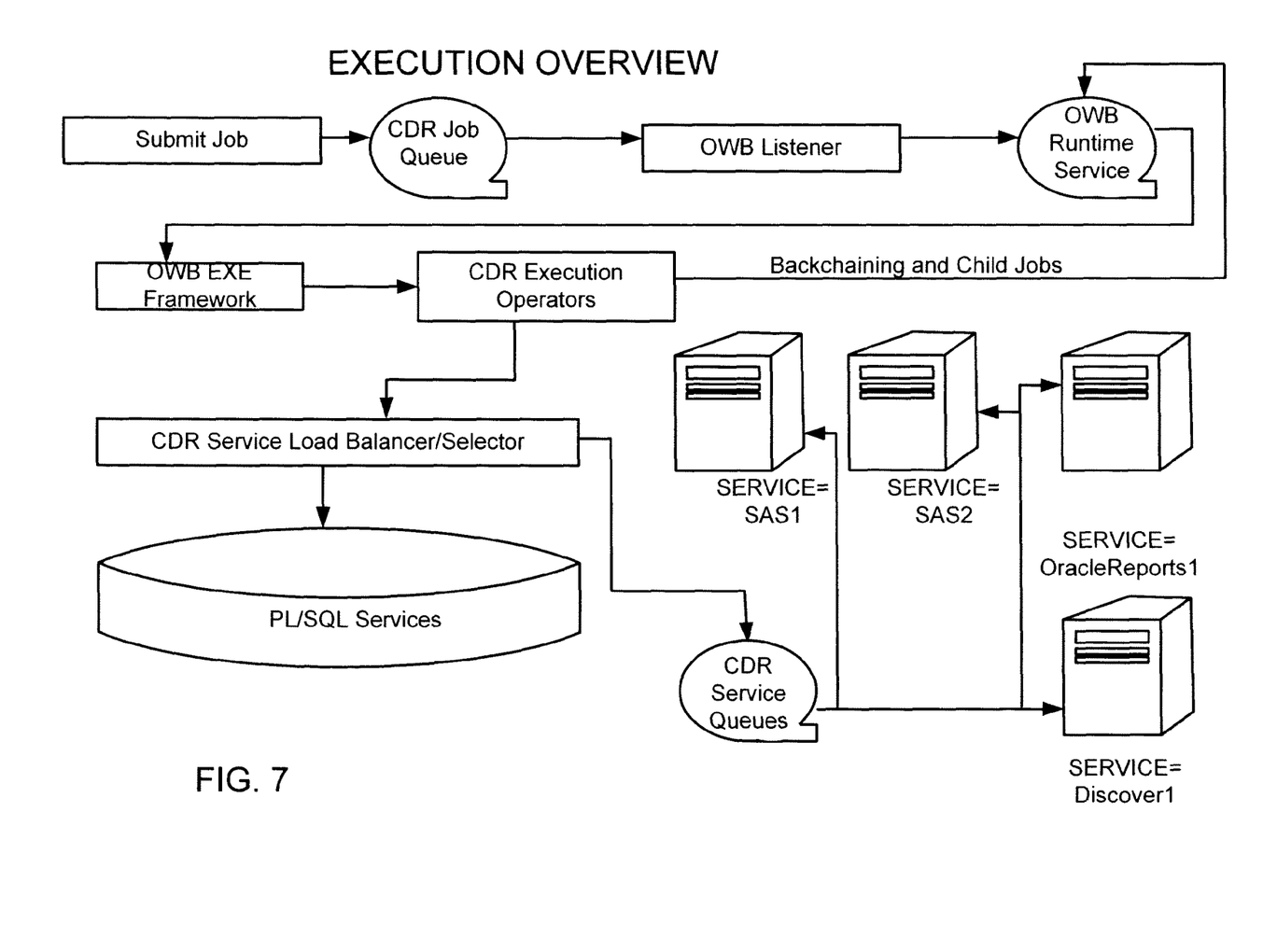
FIG. 7 is a block diagram illustrating an exemplary execution process within a CDR system of the disclosed embodiments.

In one embodiment, the aspects of the invention are adapted to be used in conjunction with a clinical data repository ("CDR") system or a Life Sciences Data Hub("LSH"). Such systems generally comprise a consistent enterprise data model and infrastructure for integrating, storing and reporting clinical and related information. One example of a CDR system incorporating features of an aspect of the invention is illustrated in FIG. 6.

A work area is a single version or state of a business application within an application area. Each work area contains a set of interconnected loading programs, transformation programs, reports and tables. All definitions are stored in the Library under version control and may be re-used. Transformations and reports can be generated using PL/SQL, OWB, Oracle*Reports, and SAS, for example. Definition 603 allows the user to define data structures, loading programs, analysis programs and reports within a flexible hierarchy (such as Project→Study→Site). These objects may be created and managed at any appropriate level, or may be referenced from a different level. For instance, a data loading program in a given study could simply reference a standard load program defined at the project level. The objects that may be managed include, table and column definitions, parameters for programs and reports, inputs and outputs for programs and reports, source code for programs and reports, including full version control, and report sets (indexed collections of individual reports).

Execution 602 allows the user to instantiate definitions as a set of database tables, then run one or more programs and review the results. Job execution can be on demand, triggered by another event, or scheduled. CDR supports flexible parameter passing between jobs.

The execution module 602 controls job execution. Features of execution 602 include on-demand, scheduled, triggered. The system of FIG. 6 can be distributed across multiple machines and technologies. Processes such as backchaining, data auditing and snapshotting, security, blinding and unblinding and incremental processing can be applied across the system.

The purpose of back chaining in a CDR system is to allow programs to trigger the execution of other programs that provide them with data if there is more recent data available. In one embodiment, programs can be invoked via backchaining only if a special "backchain" submission that specifies the parameters to use has been created. When a user submits a Program and requests the most recent data available, CDR checks, for each source table, whether the Program that writes to it has a back chain submission. If it does, CDR recursively checks whether the source tables of that program are populated by another program that itself has a backchain submission until it either comes to a load set that loads data from outside CDR or a Program whose tables cannot be populated by backchaining. CDR then checks whether the source tables for each program have been modified since the program was last executed, and, if so, executes the program to refresh its target tables. For load sets, a special function that is specific to the external data source is used to determine whether the target tables are up-do-date. This continues until all programs in the backchain are either determined to be already up-to-date or are executed. Then CDR runs the original program that initiated the backchain if it has not already been executed against the latest data in its source tables.

Figure 5:
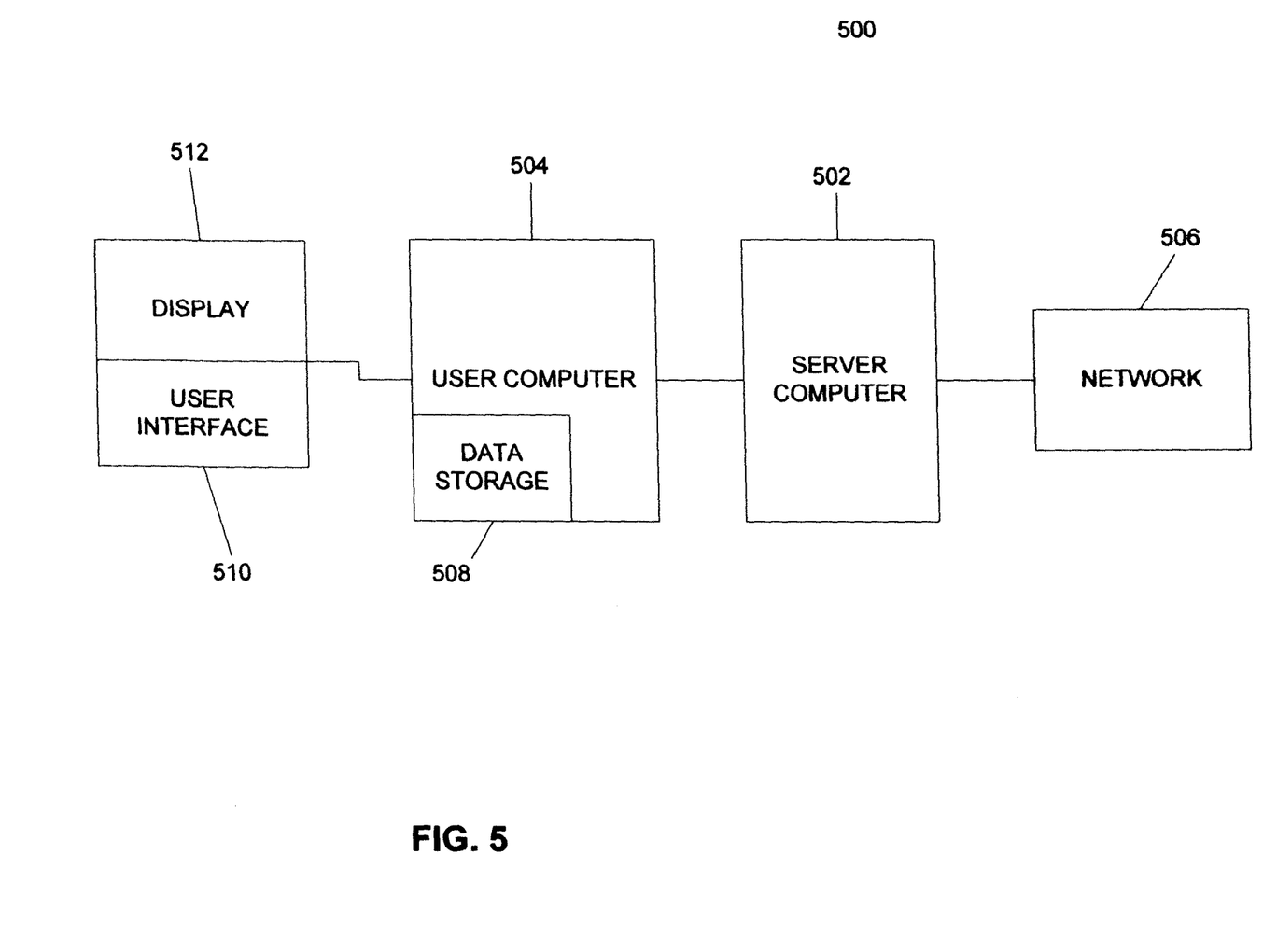
FIG. 5 is a block diagram of an exemplary architecture that may be used to practice the features of the disclosed embodiments.

For example, an AE_SUMMARY report might read data from a summary table that is created by a transform Program AE_SUMM that reads its data from raw data tables populated by a Load set LS_SETUDY3 that loads data with the Oracle Clinical study data adapter from a stable DX access account. Submitting the AE_SUMMARY report requesting the most recent data would invoke backchaining. If the AE_SUMM program has a scheduled backchain submission, CDR will check whether the load set also has scheduled backchain submission. If it does, the special load set currency function will check whether there has been a batch validation since the last time the study data was loaded. If there has been, the load set will be executed to reload the latest data; if there hasn't, the load set will do nothing. Then CDR will check whether the AE_SUMM program has been run since the last time the load set was run. IF it has not, either because the load set has just run or because the load set had already been run since the last time the summary program was run, the AE_SUMM program will be executed. Finally, CDR will check whether the AE_SUMMARY report has been run since the last time the AE_SUMM program was run. If not, CDR will run the report. If so, the CDR will offer the previous execution of the report instead of re-executing it. The disclosed embodiments may also include software and computer programs incorporating the process steps and instructions described above that are executed in different computers. In one embodiment, the computers are connected to a network, such as for example the Internet. However, in alternate embodiments the computers can be connected to, or via, any suitable network. FIG. 5 is a block diagram of one example of a typical apparatus 500 that may be used to practice aspects of the disclosed embodiments. As shown, a computer system 502 may be linked to another computer system 504, such that the computers 502 and 504 are capable of sending information to each other and receiving information from each other. In one embodiment, computer system 502 could include an origin server or computer adapted to communicate with a network 506, such as for example, the Internet or an Intranet. Computer systems 502 and 504 can be linked together in any conventional manner including a modem, hard wire connection, fiber optic link or such other suitable network connection. Generally, information can be made available to both computer systems 502 and 504 using a communication protocol typically sent over a communication channel or through a dial-up connection on ISDN line. Computers 502 and 504 are generally adapted to utilize program storage devices embodying machine readable program source code which is adapted to cause the computers 502 and 504 to perform the method steps of the disclosed embodiments. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 502 and 504 may also include a microprocessor for executing stored programs. Computer 502 may include a data storage device 508 on its program storage device for the storage of information and data. The computer program or software incorporating the processes and method steps incorporating features of the invention may be stored in one or more computers 502 and 504 on an otherwise conventional program storage device. In one embodiment, computers 502 and 504 may include a user interface 510, and a display interface 512 from which features of the invention can be accessed. The display interface 512 and user interface 510 could be a single interface or comprise separate components and systems. The user interface 508 and the display interface 512 can be adapted to allow the input of queries and commands to the system, as well as present the results of the commands and queries.

By maintaining the documentation of all program inputs and outputs under system control, including the currency of all of the sources through to their ultimate external sources, error-prone manual documentation and record keeping are eliminated. In addition, the incremental tracking through the processes allows optimization of the use of computer resources and the timeliness of output availability by eliminating the need for redundant program execution.

The invention claimed is:

1. A non-transitory computer-readable medium storing computer executable instructions that when executed by a computer cause the computer to perform a method, the method comprising:
upon detecting a request for a report,
recursively identifying backchain programs along a chain of programs that are involved in producing the report until reaching source programs of the chain of programs, where a source program is a program without a predecessor program or with a predecessor program that does not support backchaining, where the backchain programs are accessible to the computer, and where the backchain programs support executing based on whether inputs of the backchain program have been updated since the backchain program was last run; and
beginning with the source programs from the chain of programs, progressively running selective programs in the chain of programs, whose inputs have updated since the report was previously generated, until data from the report is verified as current.

2. The computer-readable medium of claim 1, the method further comprising, when a source program relies on data generated by an external system, obtaining identifying information from the external system to determine whether the data has updated since a last time the source program ran.

3. The computer-readable medium of claim 2 wherein the identifying information is modification time stamp information.

4. The computer-readable medium of claim 1, where the report is verified as current when a report producing program that produces the report has run because it is determined that an input to the report producing program has updated, and where the report is verified as current if it is determined that the report producing program has run since the last time inputs of the report producing program were updated.

5. The computer-readable medium of claim 1, where running a program whose inputs have updated since the last time the program ran comprises comparing a timestamp associated with a last run time of the program and a time stamp of an update time of an input to the program.

6. The computer-readable medium of claim 1, where running selective programs whose inputs have updated since the last time the program executed comprises examining contents of the input to establish the most recent change to any data within that input.

7. The computer-readable medium of claim 1, where running selective programs in the chain of programs comprises updating a modification timestamp associated with a data source modified by running the program.

8. The computer-readable medium of claim 7, where the data source is partitioned into independent sets by unique identifiers and where the modification timestamp is associated with one of the partitions.

9. The computer-readable medium of claim 8, where the data source is partitioned into a first partition that is associated with clinical trial data and into a second partition that is associated with test clinical trial data.

10. A method comprising:
determining data currency in a processing chain prior to generating an output report by:
backtracking along each source chain in the processing chain until a first processing application is reached;
determining if an earlier execution time of a program associated with the first processing application is later in time than a last update time of each data input to the first processing application;
re-executing the program if one of the data inputs to the first processing application has an update time that is more recent that the last execution time of the first processing application;
progressing along each remaining source chain in the processing chain until a first, unevaluated processing application is reached;
comparing a last run time of each program of each such processing application with a time stamp of each source of data to the respective processing application, and automatically re-executing the program if the time stamp of one of the source of data is more current that the last run time of the program; and
continuing progressing until the processing steps have been evaluated.

11. The method of claim 10 further comprising only re-running programs for processing applications that have more current data sources than the last run-time of the program.

12. A system comprising:
a non-transitory computer readable medium comprising a data currency tracking logic configured to record a last time of any data change for each source of data in a processing chain and a time of modification of data in any target data modified by the data processing step in the processing chain; and
a backchain system configured to:
determine the processing steps along a dependency chain used to populate data sources for an initiating data reporting or processing program recursively back through each processing step in the dependency chain that populates a source processing step until one or more source processing steps are reached that has a data source whose processing steps do not support execution via a backchain, has sources that are external to the processing system or does not have any data sources;
determine whether a program associated with each such processing step has run since each source of data for the processing step was last modified; and
if any one of the sources for the program of such processing step is more recent than a last run time of the program associated with the processing step, running the program and updating target data and creating report outputs of the processing step and recording tracking information identifying the currency of each source used as input for the processing step.

13. The system of claim 12 wherein the backchain system is further configured to:
progress along the dependency chain, once each data processing step has either been determined to be current and modified its outputs, to each other processing step that uses the output data of these programs as input; and
execute the other processing step upon determining that a source of the other processing step is more current than the last execution of the other processing step.

14. A non-transitory computer-readable medium storing computer executable instructions that when executed by a computer cause the computer to perform a method, the method comprising:
receiving a request for a report;
determining a dependency chain of programs accessible to the computer that are run to produce the report;
controlling execution of a source program at a beginning of the dependency chain upon determining the source program has not run since an input of the source program was last updated, where executing the source program modifies a first data source; and
controlling execution of a result program at an end of the dependency chain upon determining the result program has not run since an input to the result program was last modified, where an input to the result program is based on data in the first data source, and where executing the result program produces the report.

15. The computer-readable medium of claim 14, the method comprising controlling execution of one or more intermediary programs in the dependency chain upon determining the intermediary program has not run since an input of the intermediary program was last modified, where an input of an intermediary program is information contained in the first data source, and where an output of an intermediary program is an input of the result program.

* * * * *

UNITED STATES PATENT AND TRADEMARK OFFICE
CERTIFICATE OF CORRECTION

PATENT NO.       : 8,078,579 B2
APPLICATION NO.  : 11/778033
DATED            : December 13, 2011
INVENTOR(S)      : Grossman et al.

Page 1 of 1

It is certified that error appears in the above-identified patent and that said Letters Patent is hereby corrected as shown below:

On sheet 6 of 7, in figure 6, Box No. 610, line 1, delete "claaify/search" and insert -- classify/search --, therefor.

In column 1, line 31, after "most" insert -- recent --.

In column 3, line 22, delete "bachchain," and insert -- backchain, --, therefor.

Signed and Sealed this
Thirteenth Day of March, 2012

David J. Kappos
*Director of the United States Patent and Trademark Office*